(12) United States Patent
Canapa

(10) Patent No.: US 7,395,913 B1
(45) Date of Patent: Jul. 8, 2008

(54) CONVEYOR WITH BELT TO ROLLER SYNCHRONIZATION MECHANISM

(75) Inventor: Richard A. Canapa, Humbird, WI (US)

(73) Assignee: NMC-Wollard, Inc., Eau Claire, WI (US)

( * ) Notice: Subject to any disclaimer, the term of this patent is extended or adjusted under 35 U.S.C. 154(b) by 0 days.

(21) Appl. No.: 11/752,798

(22) Filed: May 23, 2007

(51) Int. Cl.
B65G 41/00 (2006.01)

(52) U.S. Cl. .................. 198/312; 198/315; 198/594; 198/812

(58) Field of Classification Search .......... 198/312, 198/313, 315, 502.4, 588, 594, 571, 812
See application file for complete search history.

(56) References Cited

U.S. PATENT DOCUMENTS

| | | | | |
|---|---|---|---|---|
| 3,596,785 A | * | 8/1971 | Weatherford, Jr. | 198/812 |
| 3,826,353 A | * | 7/1974 | Greasley | 198/313 |
| 5,348,130 A | * | 9/1994 | Thomas | 198/312 |
| 5,669,562 A | * | 9/1997 | Smith | 198/313 |
| 5,819,950 A | * | 10/1998 | McCloskey | 198/313 |
| 6,416,382 B1 | * | 7/2002 | Bavelloni | 451/5 |
| 6,688,450 B2 | * | 2/2004 | Speers et al. | 198/312 |
| 7,261,202 B1 | * | 8/2007 | Canapa | 198/812 |
| 2004/0112999 A1 | * | 6/2004 | Byram et al. | 241/34 |
| 2005/0173570 A1 | * | 8/2005 | Tanaka et al. | 241/36 |

* cited by examiner

Primary Examiner—James R Bidwell
(74) Attorney, Agent, or Firm—Anthony J. Bourget

(57) ABSTRACT

A conveying device comprising a conveyor belt, a conveyor belt speed sensor, at least one extending roller selectively extendable from the device, an extending roller speed sensor, a hydraulic motor operatively engaged with the conveyor belt, a proportional valve operatively coupled with the hydraulic motor for modulating the speed of the motor, and a controller operatively connected to the proportional valve for modulating the output thereof, the controller in communication with the belt speed sensor, and in communication with the extending roller speed sensor, the controller thereby controlling the speed of the motor to obtain a desired belt speed.

20 Claims, 5 Drawing Sheets

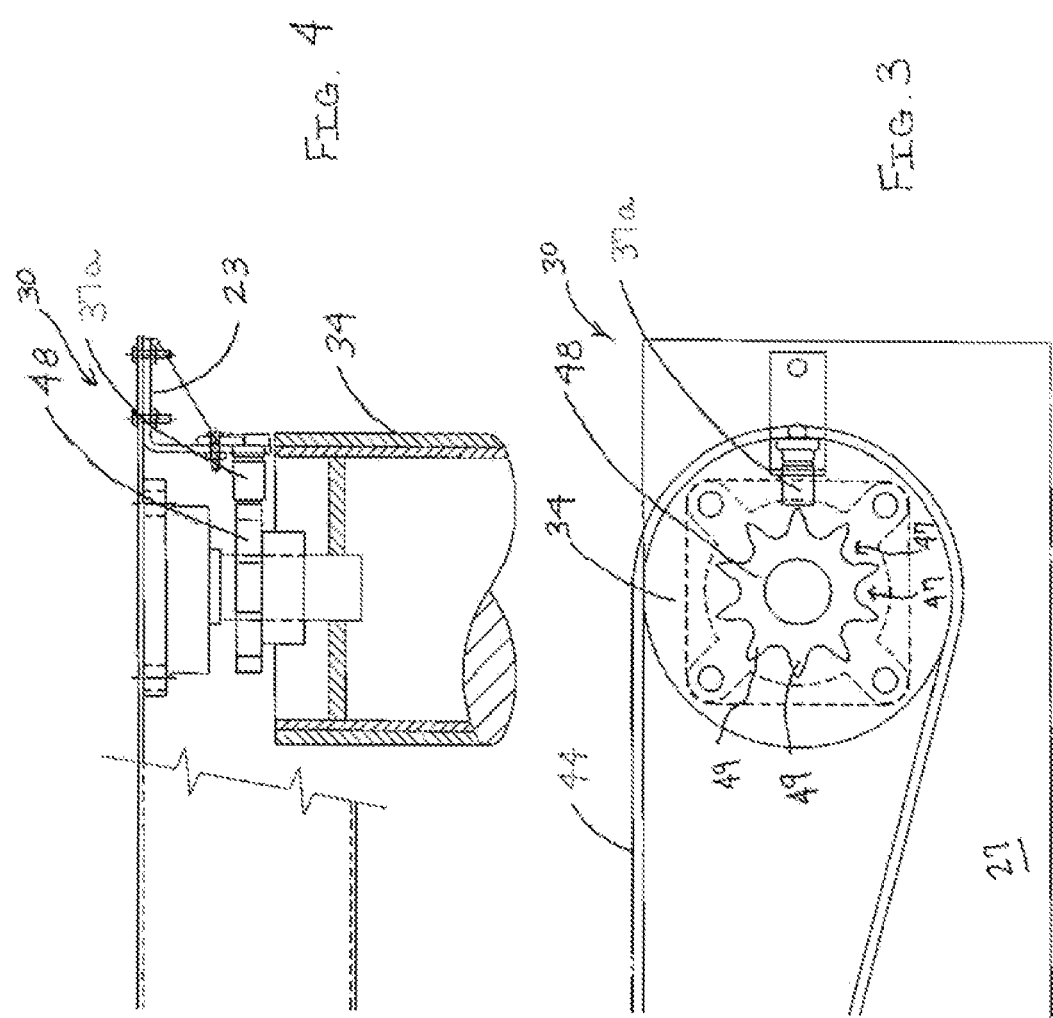

CONVEYOR WITH BELT TO ROLLER SYNCHRONIZATION MECHANISM

BACKGROUND OF THE INVENTION

1. Field of the Invention

The present invention relates generally to conveying devices, and more specifically to vertically adjustable portable conveyors, and particularly to aircraft belt loaders having extendable rollers as well as a conveyor belt.

2. Background Information

Baggage loading devices are common. A typical device includes a vehicle equipped with an endless belt upon which luggage or other items are placed. Movement of the belt conveys the luggage from one end of the vehicle to the other end. The endless belt may be engaged with a bed that raises or lowers for easier elevational movement of items. Attached to or extended from the endless belt may be a roller or series of rollers. Such extending devices may be retracted to a position beneath the endless belt and may include mechanisms to power the individual conveying rollers. Once extended, the conveying rollers receive items such a luggage or baggage and convey the items to a cargo hold of an aircraft, for instance. The individual roller elements articulate with respect to each other so the items may be transported to a variety of places depending on where the plurality of roller elements is positioned.

Applicant has found it desirable to have a conveyor maintain a generally constant or uniform belt speed which matches the speed of the individual extending roller conveyors. Having a matching speed allows items to more smoothly transition from the endless belt to the roller elements, and vice versa. If an operator desires to increase or decrease the speed of the individual extending roller or roller elements, a corresponding increase or decrease would ideally be made to the conveyor belt. Making a corresponding increase or decrease automatically would reduce time and effort of an operator and reduce the risk of mismatched speeds which might otherwise create a hazard or other problems. The present invention provides a novel conveying device and advantages over prior designs.

The device includes a control system and a sensing system to automatically adjust the conveyor belt speed of the conveyor, and preferably to adjust the belt speed to match the speed of an extending roller. The device may include a hydraulic system to power the belt, and preferably is configured with an elevating conveyor bed that is affixed to a vehicle. The device is well suited for use in the aircraft cargo loading and unloading industry, or the postal and handling industries. Numerous other advantages and novel features of the present invention are disclosed.

SUMMARY OF THE INVENTION

The present invention is directed toward a conveying device comprising a conveyor belt, a conveyor belt speed sensor, at least one extending roller selectively extendable from the device, an extending roller speed sensor, a hydraulic motor operatively engaged with the conveyor belt, a proportional valve operatively coupled with the hydraulic motor for modulating the speed of the motor, and a controller operatively connected to the proportional valve for modulating the output thereof, the controller in communication with the belt speed sensor, and in communication with the extending roller speed sensor, the controller thereby controlling the speed of the motor to obtain a desired belt speed.

A further aspect of the invention includes a conveying device comprising a portable conveyor bed having a first end and an opposite second end, the conveyor bed tiltable from a resting mode to an incline mode, a conveyor belt operatively engaged with at least one belt roller of the conveyor bed, at least one extending roller selectively extendable from the device and retractable into the device beneath the conveyor belt, an extending roller speed sensor, a hydraulic system including a hydraulic motor operatively engaged with the conveyor belt at the at last one belt roller, and a controller in communication with the extending roller speed sensor and in communication with the hydraulic system, the controller thereby controlling the speed of the motor to obtain a desired belt speed.

A further aspect of the present invention includes a conveying device comprising a conveyor belt coupled with an elevating conveyor bed, the conveyor bed connected to a vehicle, means for sensing the speed of the conveyor belt, a plurality of extending rollers selectively extendable from the device, at least one of the extending rollers including a roller, means for sensing the speed of the roller, a hydraulic motor operatively engaged with the conveyor belt, a proportional valve operatively coupled with the hydraulic motor, the proportional valve capable of modulating the speed of the motor; and a controller operatively connected to the proportional valve for modulating the output thereof, the controller in communication with the means for sensing the speed of the conveyor belt, and in communication with the means for sensing the speed of the roller, the controller thereby controlling the speed of the motor to obtain a desired belt speed.

The above summary of the present invention is not intended to describe each illustrated embodiment, aspect, or every implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which:

FIG. 3 is a section view of the conveyor of FIG. 2 with portions removed for clarity.

FIG. 4 is a partial top view of the device of FIG. 3.

Figure 1:
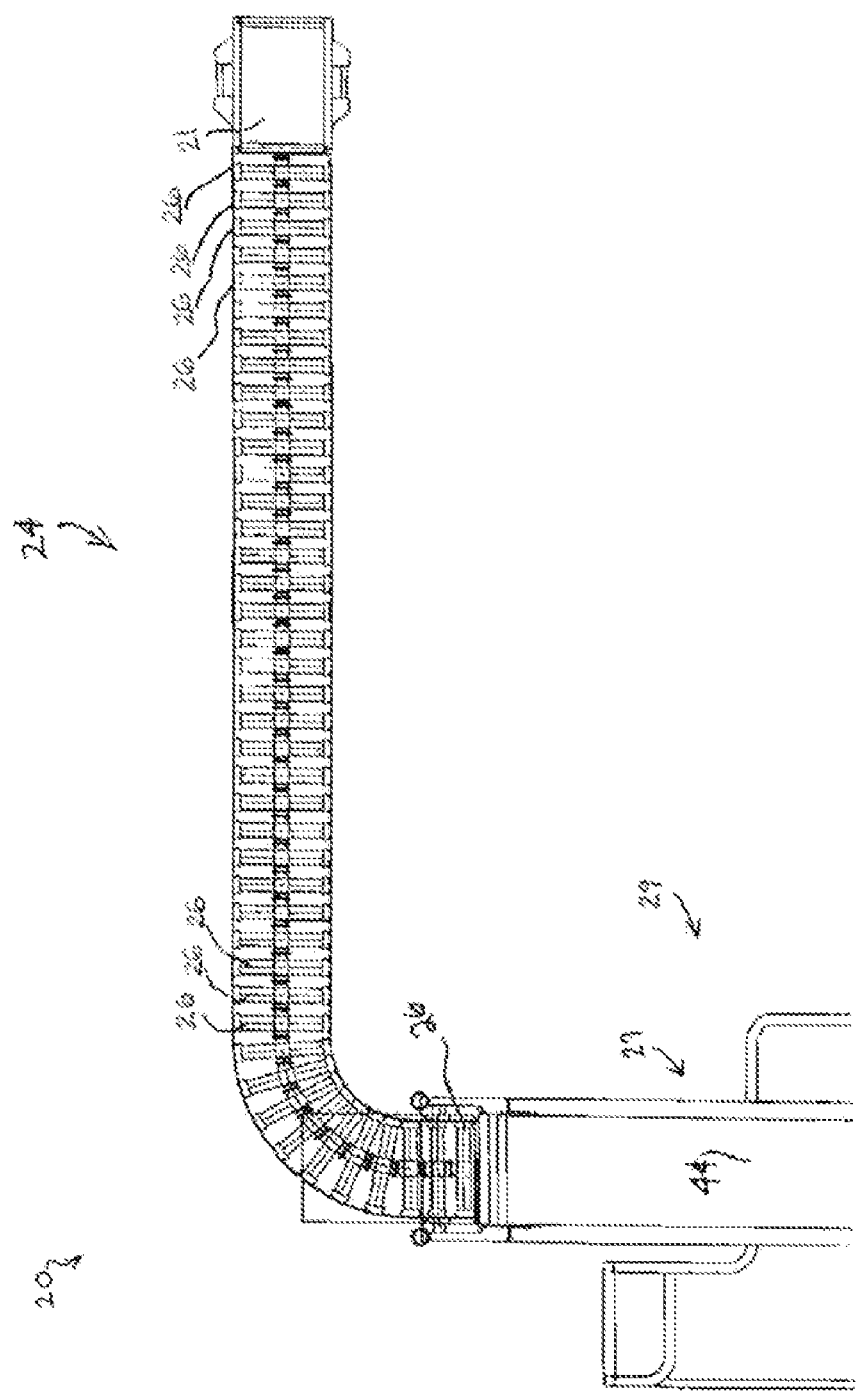
FIG. 1 is a plan view of a conveyor device made in accordance with the present invention.

While the invention is amenable to various modifications and alternative forms, specifics thereof have been shown by way of example in the drawings and will be described in detail. It should be understood, however, that the intention is not necessarily to limit the invention of the particular embodiments or aspects described. On the contrary, the intention is to cover all modifications, equivalents, and alternatives falling within the spirit and scope of the invention and as defined by the appended claims.

DETAILED DESCRIPTION OF THE INVENTION

Referring now to FIG. 1, a conveying device according to the present invention is generally depicted with reference to numeral 20. In one aspect, conveying device 20 includes a conveyor belt 44 and a retractable conveyor 24. Retractable conveyor 24 includes a plurality of conveying elements 26 which articulate with respect to adjacent elements 26 and accommodate extension of conveyor 24 into various positions. FIG. 1 shows conveyor 24 in an extended position. Conveyor 24, or a number of conveying elements 26, may be placed within the cargo hold of an aircraft, for instance, for transport of cargo items (cargo not shown). Device 20 may include a docking platform 25 intended to rest within or upon the cargo hold area of an aircraft. A front end conveying element 21 may be positioned on platform 25 when in a retracted state. Conveying element 21 may include handle switches or other controls which operate rollers to assist in the extension or retraction of conveyor 24 from device 20. As individual conveying elements 26 rotate, cargo placed on conveyor 24 is transported along the extended length of conveyor 24. Conveyor 24 may be fully or partially extended from device 20 as desired. The speed of rotation of each of the conveying elements 26 may be independently controlled but is preferably constant and uniform from element 26 to element 26 to accommodate for smooth delivery of cargo or packages thereabout.

Figure 2:
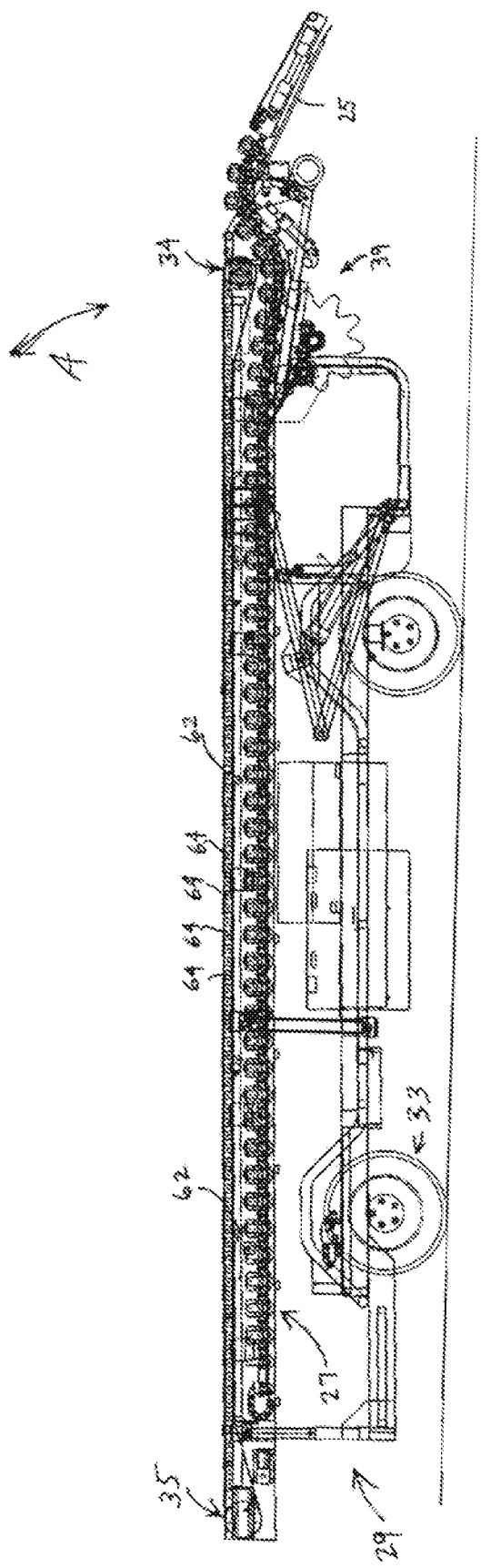
FIG. 2 is a side elevation view of a conveyor device of the present invention having retractable conveyor retracted and portions of the device removed for clarity.

Referring to FIG. 1 and FIG. 2, conveyor belt 44 is positioned with a conveyor bed 27. Bed 27 is preferably an elevating conveyor bed which raises or lowers in the direction of arrow "A". Such elevating accommodates delivery of items to an upper area such as a cargo hold or other elevated position. Preferably bed 27 is connected to a vehicle chassis 29, and is preferably pivotally connected. Chassis 29 is preferably equipped with an engine and wheels 33 for transport. FIG. 2 shows device 20 with retractable conveyor 24 retracted in a retracted position and located below belt 44. Portions of the drawing of bed 27 have been removed for clarity. Multiple conveying elements 26 are stored beneath conveyor belt 44 and may be extracted from device 20 by drive means 39, for instance.

Conveyor belt 44 is preferably an endless belt driven by pulleys and/or rollers and typically supported by multiple conveyor belt rollers. While not limited thereto, typically a headstock pulley 34 turns or drives belt 44, and may do so with the support of other rollers or devices such as a tail stock pulley 35, return idlers 62 positioned under conveyor bed 27, and/or top rollers 64 positioned between belt 44. While preferable, it may be appreciated that the drive system for conveyor belt 44 need not be limited to a headstock pulley 34. Other rollers or pulleys may be powered to turn belt 44. Preferably headstock pulley 34 is powered via a hydraulic motor 36 as is well understood.

Referring now to FIG. 3 and FIG. 4, close-up views of belt 44 and headstock pulley 34 are shown. Device 20 includes a belt speed sensor means including a belt speed sensor 30 configured adjacent belt 44. As shown in FIG. 3 and FIG. 4, sensor 30 is configured adjacent or in combination with pulley 34. It may be appreciated that sensor 30 may be positioned elsewhere along or about device 20 in order to sense a speed of travel of belt 44. As pulley 34 rotates, belt 44 rotates at an equal or substantially equal rate. Thus, the speed of travel of belt 44 may be calculated by determining the speed of rotation of pulley 34. In one aspect, speed sensor 30 may include sensor 37 which is positioned adjacent a timing gear 48. Typically gear 48 is made of metal or has metal parts, and is affixed to rotate together with pulley 34. Gear 48 includes teeth 49 and gaps 47. As teeth 49 (or an individual tooth 49) passes sensor 37, an electrical signal or pulse is created or detected and thereafter communicated to a control 70. The number and timing of pulses or signals is calculated by control 70 to determine a speed of belt 44. Sensor 30 may include a transducer element or other item capable of detecting the frequency or rate of movement of the individual teeth 49. Sensor 37a is positioned in close proximity to gear 48 in order to detect the movement of rotating teeth 49. A bracket 23 or other bracket mechanism may be used to hold or properly position sensor 37a upon device 20. Other belt speed sensor means which send a timing signal or other speed data to a controller may also be used without departing from the scope of the invention, including but not limited to optical sensors, transducers, and other types of speed sensors. Sensor means may be positioned at any point along belt 44 or at rollers associated with belt 44, and need not be limited to a sensor 30 or sensor 37a coupled with pulley 34.

Figure 6:
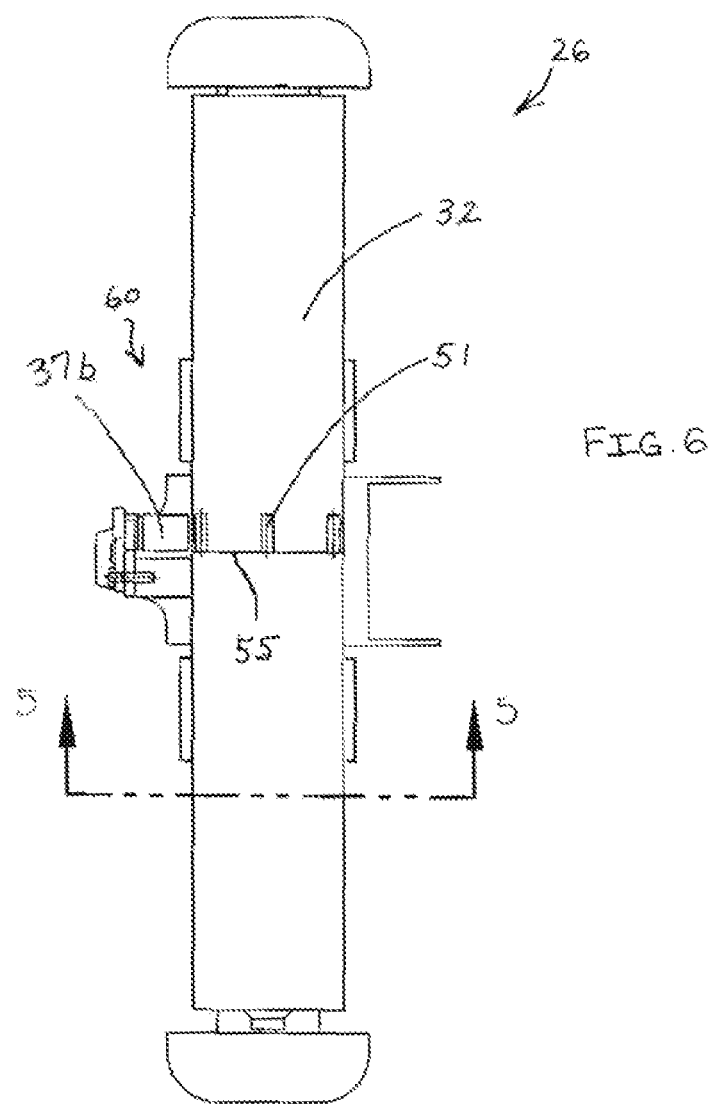
FIG. 6 is a plan view of an extending roller component of the present invention.
Figure 5:
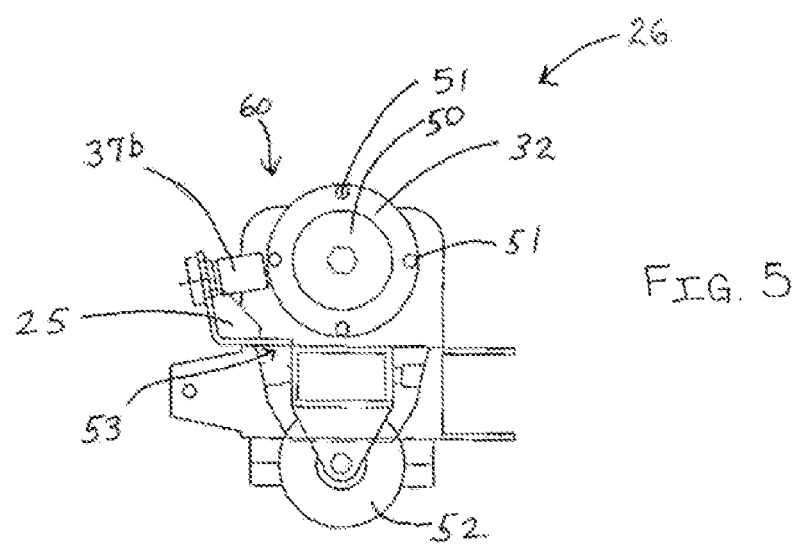
FIG. 5 is an elevation view of an extending roller component of the present invention taken along line 5-5 of FIG. 6.

Referring now to FIG. 5 and FIG. 6, close-up views of at least one extending roller 26 is shown. In this instance, roller 26 is designated as rear-end extending roller 26n representing the terminal extending roller 26n of retractable conveyor 24 positioned closest to belt 44 when conveyor 24 is fully extended. Device 20 includes an extending roller speed sensing means. In one aspect, roller 26n is equipped with extending roller speed sensor 60. While extending roller sensor means may be positioned on device 20 at different locations, including but no limited to positioning with an extending roller 26, such means is preferably associated with the rear-end roller 26n so that sensor means, such as sensor 60, may be protected within or under the conveyor bed 27. Preferably sensor 60 does not extend from bed 27.

As shown in FIG. 5, extending roller 26n is equipped with pin or pins 51. In this instance, pins 51 insert within roller sleeve 32 which is fitted about roller 50. Other arrangements for fitting of pins 51 may also be used. Preferably, pins 51 are inserted into roller sleeve 32 parallel to the axis of rotation of roller 50 and at generally equal distance with respect to other pins 51, and preferably close to the exterior surface of sleeve 32. Typically sleeve 32 may be cut at slit 55 generally at a center portion, the pins 51 may be inserted, and then sleeve 32 repositioned about roller 50. While pins 51 may be cylindrical, other shapes or configurations may be used. Pins 51 may also be a magnet or magnets. It may be appreciated that the placement of pin 50 is not limited to the configuration shown. FIG. 6 shows pin 51 inserted into roller sleeve 32 at about the midpoint of roller 26 in the axial direction. It may be appreciated that pins 51 could be inserted at any point along the length of roller 26. Speed sensor 60 includes pin 51 and sensor 37b. Speed sensor 37b may be mounted to plate 53 with bracket 25 or other positioning item. Preferably sensor extends to a position adjacent roller 50 so as to detect pin 51 as roller 50 turns. As pin 51 turns or passes sensor 37b, an electrical signal or pulse is created or detected and thereafter communicated to a control 70. Sensor 60 may include a transducer element or other item capable of detecting the frequency or rate of movement of the individual pins 51. Other means for sensing the speed of roller 50 or conveying roller 26 which send a timing signal or other speed data to a controller may also be used without departing from the scope of the invention, including but not limited to optical sensors, transducers, and other types of speed sensors. Sensor means may be positioned at any point along or about retractable conveyor 24 or extending rollers 26, and need not be limited to a sensor 30 or sensor 37b.

Figure 7:
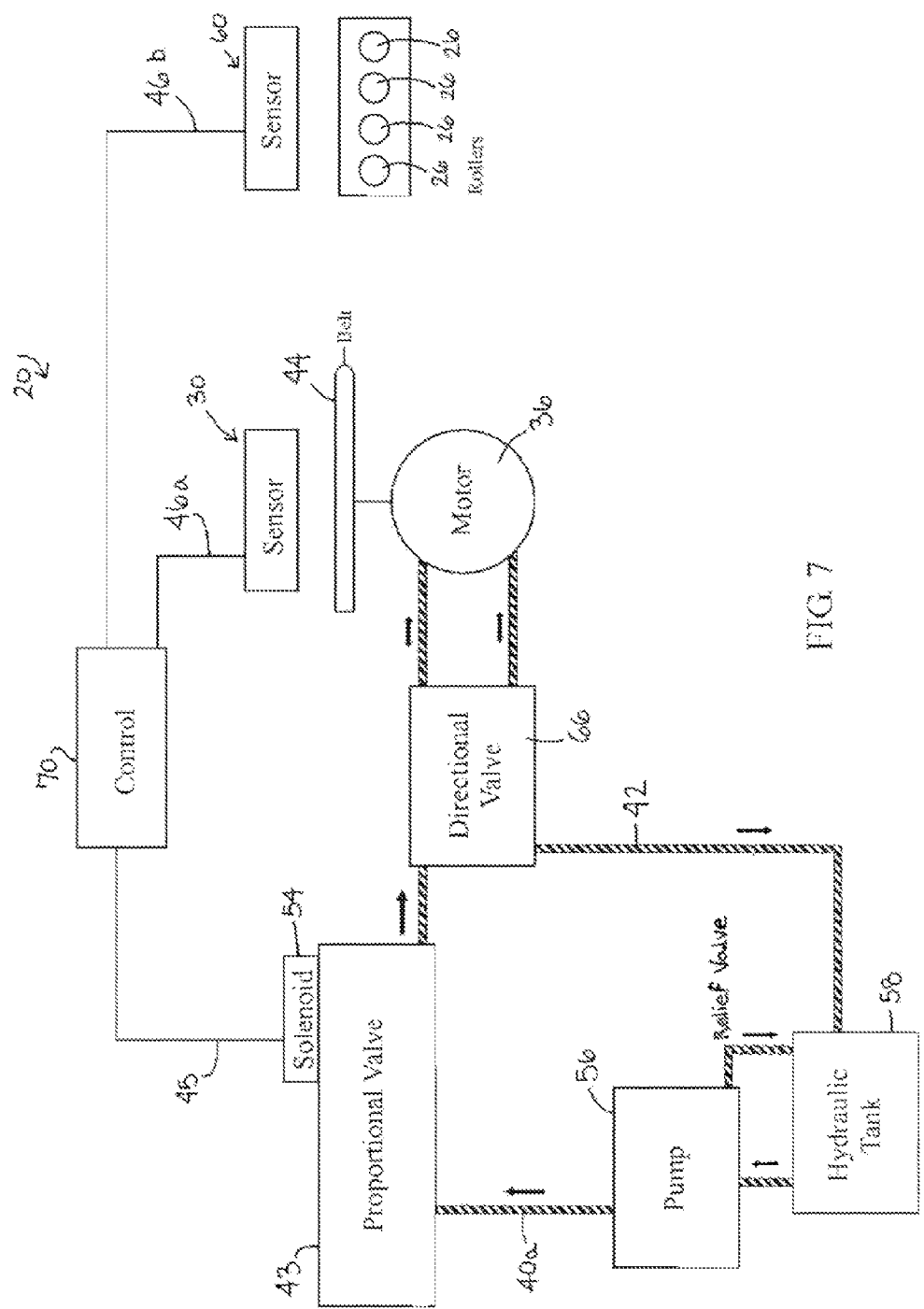
FIG. 7 is a schematic of one aspect of the present invention.

FIG. 7 is an operational schematic depicting on aspect of conveying device 20. Device 20 includes a hydraulic system and the speed control system. A system controller device 70 is operatively connected to belt speed sensor 30 via signal line 46*a*, and to roller speed sensor 60 via signal line 46*b*. Controller 70 is also operatively connected to proportional valve 43 via signal line 45. It may be appreciated that controller 70 may be operatively connected to sensor means via an electrical line, radio signal, light signal, or other means of sending or receiving data. The controller device 70, typically an integrated circuit device or computer, calculates the speed of conveyor belt 44 and extending rollers 26 based on the outputs from the respective speed sensors 30, 60. If there is a change in speed at rollers 26, control 70 detects the change and may react by sending a signal to solenoid 54 coupled to proportional valve 43 via signal line 45. This signal will cause proportional valve 43 to either increase or decrease the flow of hydraulic fluid to hydraulic motor 36, which will alter the speed of hydraulic motor 36. The drive system of conveyor belt 44 is powered by hydraulic motor 36 and this change in speed will either increase or decrease the speed of belt 44.

The control 70 may be programmed to recognize 4 pulses of the pins 51 to equal one revolution of roller 50, and this data is used in conjunction with the diameter measure of the roller to determine or calculate the extending roller speed. It may be appreciated that other sensor means may be used.

In further reference to FIG. 7, hydraulic motor 36 may be a constant speed hydraulic motor with a pump 56 which pumps fluid from tank 58. Excess fluid spills through a relief valve from pump 56 back to tank 58 as needed. Other relief valves may be included as desired in such a hydraulic system. A directional valve 66 may be used to control forward or reverse direction of motor 36 which in turn reverses direction of hydraulic flow and of belt 44 as desired.

In operation, controller 70 may be preprogrammed (or programmed or switched on demand) to have the speed of belt 44 match the speed of rollers 26, and vice versa. If an operator desires to increase the speed of rollers 26, the speed of belt 44 automatically increases. Preferably the speed of belt 44 and speed of rollers 26 is a matching speed, and continues to be a matching speed even after changing either the speed of belt 44 or the speed of roller 26*n*. While greater or lesser speeds may be achieved, in a typical baggage transport operation a roller speed and belt speed of between approximately 60 feet to 75 feet per minute may be established. An operator may set the speed of rollers 26 and may vary such speeds in a variety of ways, such as through use of changes in voltages or frequencies or other methods. A controller may be modified or manipulated with use of a computer to adjust the roller speed as desired. Control 70 may include an integrated circuit and/or readable and/or programmable memory or is otherwise a programmable controller.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular CONVEYOR WITH ROLLER TO BELT SYNCHRONIZATION MECHANISM as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A conveying device comprising:
   a conveyor belt;
   a conveyor belt speed sensor;
   at least one extending roller selectively extendable from said device;
   an extending roller speed sensor;
   a hydraulic motor operatively engaged with said conveyor belt;
   a proportional valve operatively coupled with said hydraulic motor for modulating the speed of said motor; and
   a controller operatively connected to said proportional valve for modulating the output thereof, the controller in communication with said belt speed sensor, and in communication with said extending roller speed sensor, said controller thereby controlling the speed of the motor to obtain a desired belt speed.

2. The device of claim 1 wherein said conveyor belt is operatively engaged with at least one belt roller.

3. The device of claim 2 wherein said at least one belt roller is a head stock pulley.

4. The device of claim 3 wherein said belt speed sensor is coupled with said head stock pulley.

5. The device of claim 1 wherein said belt speed sensor includes means for measuring the speed of said conveyor belt.

6. The device of claim 1 wherein said conveyor belt is engaged with an elevating conveyor bed.

7. The device of claim 1 wherein said conveyor belt is engaged with a conveyor bed, said conveyor bed pivotally connected to a vehicle chassis.

8. The device of claim 1 wherein said belt speed sensor includes a speed transducer operatively engaged with at least one belt roller.

9. The device of claim 1 wherein said belt speed sensor includes a timing gear.

10. The device of claim 1 further comprising a plurality of extending rollers selectively extendable from and retractable into said device.

11. The device of claim 10 wherein said extending roller speed sensor is coupled with a rear-end extending roller.

12. The device of claim 1 wherein said extending roller speed sensor includes at least one metal pin positioned within a sleeve of said roller.

13. The device of claim 1 further comprising a directional valve coupled with said motor.

14. A conveying device comprising:
   a portable conveyor bed having a first end and an opposite second end, said conveyor bed tiltable from a resting mode to an incline mode;
   a conveyor belt operatively engaged with at least one belt roller of said conveyor bed;
   at least one extending roller selectively extendable from said device and retractable into said device beneath said conveyor belt;

an extending roller speed sensor;

a hydraulic system including a hydraulic motor operatively engaged with said conveyor belt at said at last one belt roller; and a controller in communication with said extending roller speed sensor and in communication with said hydraulic system, said controller thereby controlling the speed of said motor to obtain a desired belt speed.

15. The device of claim 14 further comprising means for sensing the speed of said conveyor belt, said controller in communication with said means for sensing the speed of said conveyor.

16. The device of claim 15 wherein said means for sensing the speed of said conveyor belt includes a conveyor belt speed sensor.

17. The device of claim 14 wherein said hydraulic system includes a proportional valve operatively coupled with said hydraulic motor for modulating the speed of said motor.

18. A conveying device comprising:

a conveyor belt coupled with an elevating conveyor bed, said conveyor bed connected to a vehicle;

means for sensing the speed of said conveyor belt;

a plurality of extending rollers selectively extendable from said device, at least one of said extending rollers including a roller;

means for sensing the speed of said roller;

a hydraulic motor operatively engaged with said conveyor belt;

a proportional valve operatively coupled with said hydraulic motor, said proportional valve capable of modulating the speed of said motor; and a controller operatively connected to said proportional valve for modulating the output thereof, the controller in communication with said means for sensing the speed of said conveyor belt, and in communication with said means for sensing the speed of said roller, said controller thereby controlling the speed of the motor to obtain a desired belt speed.

19. The device of claim 18 wherein said means for sensing the speed of said conveyor belt includes a conveyor belt sensor coupled with a headstock pulley and wherein said at least one extending roller includes a transport roller.

20. The device of claim 18 wherein said controller is a programmable controller.

* * * * *